United States Patent
Zhao (10) Patent No.: US 11,859,380 B2
(45) Date of Patent: Jan. 2, 2024

(54) DEVICE AND METHOD FOR IMPROVING ADHESIVE ANCHOR PERFORMANCE

(71) Applicant: UWM Research Foundation, Inc., Milwaukee, WI (US)

(72) Inventor: Jian Zhao, Mequon, WI (US)

(73) Assignee: UWM Research Foundation, Inc., Milwaukee, WI (US)

( * ) Notice: Subject to any disclaimer, the term of this patent is extended or adjusted under 35 U.S.C. 154(b) by 0 days.

(21) Appl. No.: 17/592,073

(22) Filed: Feb. 3, 2022

(65) Prior Publication Data

US 2022/0154452 A1     May 19, 2022

Related U.S. Application Data (62) Division of application No. 16/362,282, filed on Mar. 22, 2019, now abandoned.

(60) Provisional application No. 62/647,357, filed on Mar. 23, 2018.

(51) Int. Cl.
| | |
|---|---|
| *F16B 13/14* | (2006.01) |
| *E04B 1/41* | (2006.01) |
| *E21B 10/44* | (2006.01) |

(52) U.S. Cl.
CPC ............ *E04B 1/4157* (2013.01); *E21B 10/44* (2013.01)

(58) Field of Classification Search
CPC ................ F16B 13/141; F16B 25/0026; F16B 25/0068; E04B 1/4157; E21B 10/44
See application file for complete search history.

(56) References Cited

U.S. PATENT DOCUMENTS

| | | |
|---|---|---|
| 3,902,399 A | 9/1975 | Yotti |
| 4,832,536 A | 5/1989 | Spross et al. |
| 5,085,026 A | 2/1992 | McGill et al. |
| 5,263,804 A | 11/1993 | Ernst et al. |
| 5,653,563 A | 8/1997 | Ernst et al. |
| 5,733,083 A | 3/1998 | Heminger |
| 5,885,041 A | 3/1999 | Giannuzzi et al. |
| 6,484,471 B2 | 11/2002 | Steed et al. |
| 7,909,338 B2 | 3/2011 | Koehler et al. |
| 7,950,885 B2 | 5/2011 | Rosenkranz |
| 8,485,769 B2 | 7/2013 | Rosenkranz |

(Continued)

OTHER PUBLICATIONS

American Society for Testing and Materials (2016) ASTM D897: Standard Test Method for Tensile Properties of Adhesive Bonds, ASTM International, West Conshohocken, PA.

(Continued)

*Primary Examiner* — Brian E Glessner
*Assistant Examiner* — Daniel J Kenny
(74) *Attorney, Agent, or Firm* — Boyle Fredrickson, S.C.

(57) ABSTRACT

A cured concrete and stone bore working tool and method of forming radially oriented discontinuities in a bore or perforation formed in a cured concrete or stone material such that, after use or application of the tool, the perforation formed in the cured concrete or stone material is configured to provide a non-planar adhesive interface and isolate a properly sized anchor or fastener from direct contact with the wall of the bore. Fasteners or anchors adhesively secured in bores previously treated with the bore treating tool exhibit improved creep failure performance as compared to fasteners adhesively secured to untreated bores.

4 Claims, 4 Drawing Sheets

(56) References Cited

U.S. PATENT DOCUMENTS

| | | | | |
|---|---|---|---|---|
| 8,517,641 | B2* | 8/2013 | Dubon | F16B 13/144 52/707 |
| 8,556,558 | B1* | 10/2013 | Hunt | F16B 39/021 411/395 |
| 8,920,093 | B2 | 12/2014 | Hettich | |
| 2002/0111126 | A1* | 8/2002 | Ernst | B24B 27/0076 451/61 |
| 2006/0285940 | A1 | 12/2006 | Walther | |
| 2009/0016813 | A1 | 1/2009 | Gonzalez et al. | |
| 2010/0247267 | A1* | 9/2010 | Bianchi | F16B 25/0084 411/387.4 |
| 2016/0281383 | A1* | 9/2016 | Fujita | F16B 13/126 |
| 2017/0138390 | A1* | 5/2017 | Hakenholt | F16B 13/141 |
| 2021/0301853 | A1* | 9/2021 | Pol | F16B 25/0026 |

OTHER PUBLICATIONS

Comite Euro-International du Beton (CEB) (1994) Fastenings to Concrete and Masonry Structures: State of the Art Report. Thomas Telford Service Ltd., London.

Cook, R. A., Kunz, J., Fuchs, W., and Konz, R., (1998) "Behavior and Design of Single Adhesive Anchors Under Tensile Load in Uncracked Concrete," ACI Structural Journal, V. 95, No. 1, pp. 9-26.

Cook, R., Douglas, E., and Davis T. (2009) Adhesive Anchors in Concrete Under Sustained Loading Conditions. NCHRP Report 639, Washington, DC.

Darwin, D. and Zavaregh, S. (1996) "Bond Strength of Grouted Reinforcing Bars." ACI Structural Journal, vol. 93, No. 4, pp. 486-495.

Eligehausen, R., Cook R. A., and Appl. J (2006) "Behavior and Design of Adhesive Bonded Anchors," ACI Structural Journal, vol. 103, No. 83, pp. 822-831.

Hormann-Gast, A. and Silva, J. (2013) "Revisions to ICC-ES Acceptance Criteria for Post-installed Adhesive Anchors, AC308" ICC-ES Technical Document # 14-09871.

Simulia (2014) "Abaqus 6.13 Analysis User's Guide" vol. 1.

Simulia (2014) "Abaqus 6.13 Analysis User's Guide" vol. 2.

Wander, S. (2008) "Tunnel of Terror." National Aeronautics and Space Administration: System Failure Case Studies, vol. 2 No. 5.

HILTI® 2013 Company Report.

Report 355.1R-91, "State-of-the-Art Report on Anchorage to Concrete," American Concrete Institute (ACI) (1998).

Michigan Department of Transporatation (MDOT), "Design Procedures for Concrete Anchors (Mechanical Expansion and Bonded Anchors)," Testing and Research Section (1998).

Texas Department of Transportation, "DMS-6100 Epoxies and Adhesives," Departmental Materials Specification (2014).

Mattis, L. and Silva, J., "Special Inspection Guidelines for Post-Installed Anchors," Concrete Anchor Manufacturers Association (CAMA), Revision (2011).

Gerber, B. and Ekenel, M., "Building Code Requirements for Inspection of Adhesive Anchors in Concrete," Journal of Construction Engineering and Management, vol. 139(10), (2013).

Overhead Installation of Injection-Type Adhesive Anchors CI3807Silva 6837.

* cited by examiner

DEVICE AND METHOD FOR IMPROVING ADHESIVE ANCHOR PERFORMANCE

CROSS REFERENCE TO RELATED APPLICATIONS

This application is a divisional patent application and claims priority to currently pending U.S. Non-provisional patent application Ser. No. 16/362,282 filed on Mar. 22, 2019 titled "Device and Method for Improving Adhesive Anchor Performance" and which claims priority to U.S. Provisional Patent Application Ser. No. 62/647,357 filed on Mar. 23, 2018 titled "Device and Method for Improving Adhesive Anchor Performance" and the disclosures of each of which are incorporated herein.

STATEMENT REGARDING FEDERALLY SPONSORED RESEARCH OR DEVELOPMENT

Not applicable.

BACKGROUND OF THE INVENTION

1. Field of the Invention

The present invention relates generally to the securing of anchors or fasteners to stone and concrete materials and, more specifically, to a device and method for improving the interaction between a supporting material, an anchor, and an adhesive disposed therebetween.

2. Discussion of the Related Art

Virtually every industry requires the periodic securing of various materials to one another for any number of reasons. In construction practices, one such application includes the securing of anchors or fasteners relative to one concrete or stone structure in a manner that allows securing of additional structures relative thereto. Although some applications allow positioning of a fastener or anchor prior to curing of the underlying concrete, other applications rely on the formation at a desired location of a perforation or hole in cured concrete material and the subsequent cooperation of an anchor or fastener with the perforation. Whereas some applications rely on mechanical wedging of the anchor or fasteners with the wall of the perforation, other applications can include the utilization of an adhesive that provides securing of the fastener or anchor relative to the wall of the perforation. The customary practice of forming and cleaning a bore or perforation is shown in image A of FIG. 12, placement of the adhesive and subsequent placement of a fastener as shown in image B, and the curing and subsequent securing of related structures as shown in image C associated with FIG. 12 and FIG. 13.

Figure 12:
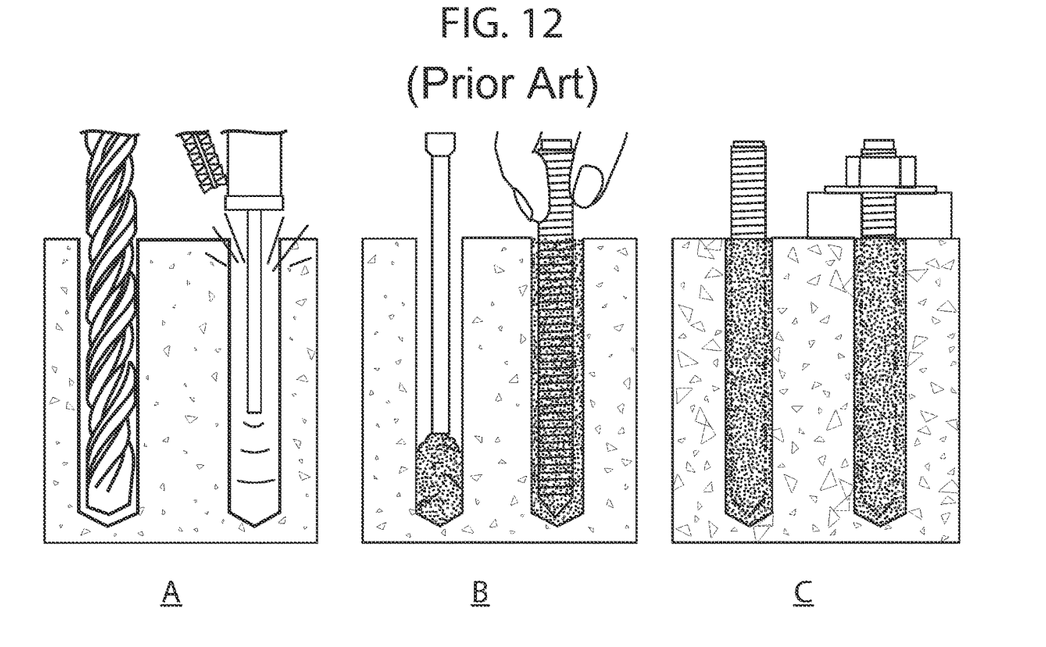
FIGS. 12 and 13 are a sequential graphical representation of a process for deploying adhesively secured concrete anchors.
Figure 13:
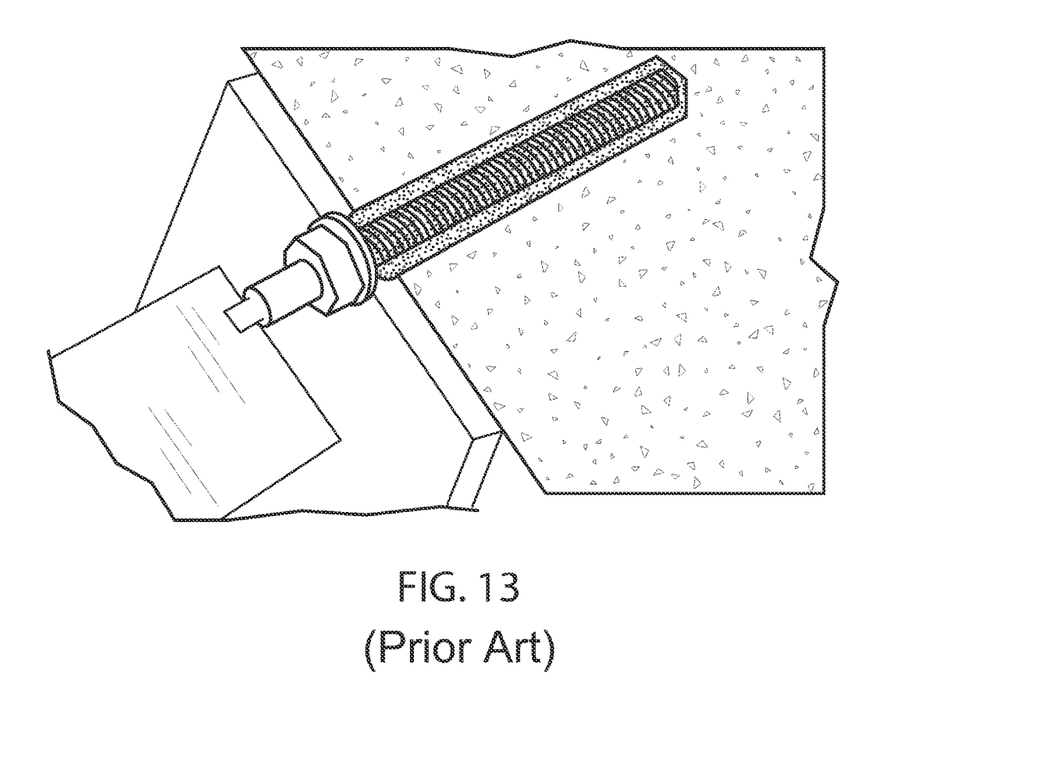

In this latter application, unintended or undesired cooperation of the adhesive with the surface defined by the bore or perforation and/or the surface of the fastener or anchor can result in premature or unexpected failure of the connection between the anchor or fastener and the underlying support structure in various manners. Referring briefly back to FIG. 12, an adhesive anchoring system commonly consists of a fastener or anchor in the form of a metal rod that is inserted into a drilled hole with adhesives, such as epoxy, acting as the bonding agent. As alluded to above, known adhesive anchoring systems can be unreliable because the adhesive-concrete-fastener and anchor interfaces can be affected by many factors. For example, a field study conducted in 2011 of anchor installation at construction sites in California, Florida, Illinois, New York, and Pennsylvania indicated that nearly none of a plurality of drilled holes were properly cleaned prior to introduction of the adhesive and/or anchor or fastener. Concrete dust left behind after the boring process was found to detrimental impact the anchor mounting security or reduced load withstanding capacity. The adhesive-concrete bonding can be detrimentally affected by various conditions including dust or debris left in the drilled hole, temperature and humidity conditions associated with the underlying concrete, as well as placement, operation, curing of the adhesives, subjecting of the mounting arrangements to freeze/thaw cycles, etc.

Various real world examples evidence premature and unexpected failures of currently employed adhesive anchor securing methodologies. On Jul. 10, 2006, multiple adhesive anchors associated with the Fort Point Channel Tunnel in Boston Massachusetts failed resulting in the unexpected falling of multiple tunnel ceiling panels and associated debris. Subsequent investigation showed that the failure began with the simultaneous creep failure of several anchors which precipitated the gradual creep failure of adjacent adhesive fasteners. On Dec. 2, 2012, a similar collapse of ceiling structures occurred in the Sasago Tunnel in Japan. The anchors in this case were capsule-type adhesive anchors, wherein placement of an anchor or fastener ruptures a capsule that contains the adhesive and has been disposed in the perforation prior to placement of the anchor or fastener, rather than injection-type anchors, wherein a desired amount of a desired adhesive is injected into the perforation prior to placement of the anchor or fastener.

In response to these failures and the subsequent investigations, the National Transportation Safety Board (NTSB) noted a lack of guidance with respect to the design and use of adhesive anchors in construction, such that the American Concrete Institute (ACI) developed design and qualification procedures for adhesive anchors that were implemented in the ACI 318-11 Code 5 and a recently formulated ACI 355.4-11 standard. In addition, at the request of ACI Committee 318, Structural Concrete Building Code, the ACI Certification department fast-tracked the implementation of a certification program for installers of adhesive anchors using input from industry subject-matter experts. These efforts have resulted in substantial improvements in the safety of adhesive anchors, which continue to be widely used in construction due to their versatility.

Regardless of the perforation preparation steps and adhesive placement methodologies employed, shortcomings remain prevalent in achieving the desired interaction between the anchor or fastener, the adhesive, and the supporting surface defined by the perforation formed in the concrete or stone materials. Regardless of the horizontal or vertical orientation of the anchor, the interface between the perforation, the adhesive, and the body of the anchor or fastener present several substantially planar interfaces associated with adhesively securing anchors or fasteners relative to an underlying structure. Various shortcomings associated with achieving a uniform presentation of the adhesive relative to the fastener or anchor and the perforation are discussed further in a July 2016 article titled "Overhead Installation of Injection-Type Adhesive Anchors" by John Silva and the disclosure of which is incorporated herein.

Still others, in an attempt to improve reliability associated with placement and operation of adhesive anchor or fastener connection methodologies provide fasteners or anchors that are configured to operatively engage the wall or directly engage the concrete or stone material that defines the wall of the perforation during placement. U.S. Patent Application Publications 2015/0292543 and U.S. Pat. No. 8,419,331 disclose two such approaches wherein the exterior radial surface of the fastener or anchor includes one of more threads or lobes that engage the wall of the perforation during placement and subsequent use of the anchor during securing operations. That is, a portion of the anchor itself provides a direct contact engagement with the underlying concrete or stone material thereby complicating the determination of the cause of any particular failure event. The methodologies disclosed in these publications do not modify the fastener or anchor facing surface defined by the wall of the perforation but are rather configured to provide partial deformation of the anchor during the securing operation. Such approaches complicate the calculations associated with failure predictions of the discrete fasteners or anchors in as much as portions of the fasteners engage straight or planar portions of the concrete surface of the perforation and other portions of the fastener or anchor are secured relative thereto via the adhesive.

It is therefore, rather than providing alternate anchor or fastener constructions and/or adhesive or epoxy chemistries, desired to provide a perforation conditioning tool and adhesive anchor securing methodology that provides a robust connection methodology and which provides a highly repeatable adhesive anchor or fastener placement.

BRIEF DESCRIPTION OF THE INVENTION

The present invention provides a cured concrete perforation treatment tool and adhesive mounting system that overcomes one or more of the drawbacks discussed above. A first aspect of the invention discloses a cured concrete working tool having an elongate body that is defined by a work facing end and a tool facing end and a radially out-ward directed surface between the work facing end and the tool facing end of the perforation treatment tool. The at least one projection extends in an outward radial direction from the radially outward directed surface of the elongate body proximate the work facing end. The at least one projection is constructed to remove cured concrete from a wall of a drilled hole in concrete/rock during introduction of the elongate body in an axial direction relative to the perforation to define a non-planar shape of the wall of the perforation upon extraction of the elongate body and prior to placement of an adhesive and an anchor relative to the perforation and such that the anchor is maintained in a spaced relationship from the wall of the perforation.

Another aspect of the present invention discloses a method of providing an adhesive concrete anchor system that includes forming a perforation in a cured concrete material. After formation of the perforation, a plurality of channels are formed in a radially inward directed surface of the cured concrete material that faces the perforation. An amount of an adhesive is disposed in the perforation and an anchor is placed in the perforation such that the anchor is completely offset in an inward radial direction from the radially inward directed surface of the cured concrete material.

The cured concrete working tool creates textures and/or threads in drilled holes in concrete to improve the capacity and safety of adhesive anchoring systems, including epoxy anchors and post-cure installed reinforcing bars. The engineered wall texture associated with formation of the threads in a drilled hole in concrete are different from those randomly created using steel brushes or the like in that the textures are created using a cured concrete working tool in the form of a concrete tapping bit rather that a fastener or anchor that is constructed to be left in place after initial introduction of the fastener such that the fastener is rendered unusable or usable at only a fraction of the securing or holding energy associated with the initial introduction of the fastener with a suitably selected hole size. It is envisioned that the texture or contour of the wall of the perforation can be provided in various forms such as helix threads and in a variety of cross-sectional shapes and a variety of pitches. As disclosed further below, the proposed helix threads accommodate high-strength deformed bars with helix deformations and which are oriented generally perpendicular to direction associated with the hole or perforation. The cross section of the threads can be provided in any shaped such as, but not limited to, partial circle, triangle, trapezoid, square, etc. shapes.

These and various other aspects, features, and advantages of the present invention will be made apparent from the following detailed description and the drawings.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

In describing the preferred embodiments of the invention which are illustrated in the drawings, specific terminology is resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto can often be used. They are not limited to direct connection but include connection through other elements where such connection is recognized as being equivalent by those skilled in the art.

DESCRIPTION OF THE PREFERRED EMBODIMENT

FIGS. 1-6 show various views of cured concrete perforation working tools according to the present invention. As shown therein, each cured concrete working tool 20, 22, 24, 26, 28, 30 is defined by an elongate body 32, 34, 36, 38, 40, 42 that extends between a respective work facing end 44, 46, 48, 50, 52, 54 and a respective tool facing end 56, 58, 60, 62, 64, 66. Each tool facing end 56, 58, 60, 62, 64, 66 is constructed to operationally cooperate with a driving implement or power tool 70 (FIG. 7) that is configured to impart a rotational load 72 (FIG. 1) and preferably an axial or impact load 74 relative to the driving engagement defined therebetween.

Figure 3:
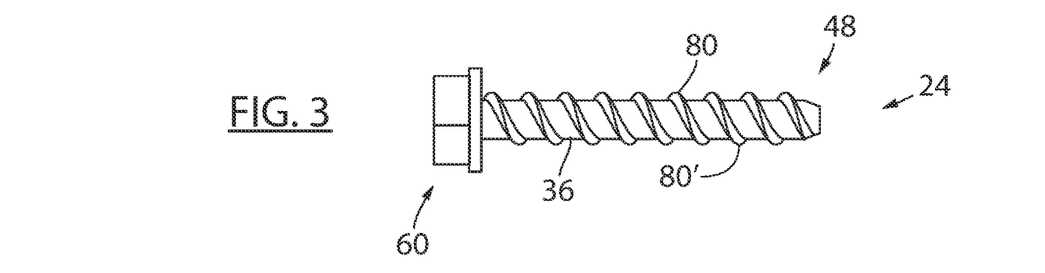
FIG. 3 is a plan view of a concrete working tool according to another embodiment of the present invention.

Although each tool facing end 56, 58, 60, 62, 64, 66 is shown as having what is generally understood as a male engagement end, it is appreciated that alternate driving arrangements may be provided. For instance, the respective driving end 56-66 could be provided as a receptacle rather than a projection wherein the receptacle is shaped to cooperate with a projection associated with driving tool 70. It is further appreciated that each respective driving tool end 56-66 may be provided with driving arrangements other than those shown and as are customary within various cured concrete and/or fastener driver industries and/or applications. For instance, as shown in FIG. 3, driving tool end 60 of cured concrete working tool 24 has a generally hexagonal shaped interface which is configured to cooperate with a socket or the like. Alternative, the respective driving tool end could be configured to be engaged by a square driven member of a battery or electric powered impact hammer or rotary impact hammer drilling device. Regardless of the specific configuration employed, each respective driving tool end 56-66 of each respective concrete working tool is preferably constructed to facilitate both clockwise and counterclockwise rotational operation of the respective working tool 20-30 relative to an underlying cured concrete material as disclosed further below. It is further appreciated that the rotational and/or impact operation of the discrete working tools 20-30 are constructed to remain engaged with the respective driving tool during both the clockwise and counterclockwise operation of the working tool and during axial translation of the discrete working tool relative to the underlying concrete and/or rock material. That is, the rotational operation of driving tool relates to both the placement and extraction of the working tool relative to an underlying perforation as well as the construction of the respective threads or channels associated with use thereof.

Whereas in some embodiments, such as tools 24-30, a respective tool has a generally solid cross-sectional shape, in other configurations, such as tools 20, 22, an elongate channel 74, 76 can be formed to extend in the axial direction 74 along a portion of the respective body 32, 34 of the respective tool 20, 22. Respective channels 74, 76 facilitate extraction of the spoils associated with operation of tools 20, 22 relative to the cured concrete or stone material during interaction therewith as disclosed further below. Channels 74, 76 further provide a discrete cutting face associated with each respective projections 80, 80' during operation thereof and facilitate starting of the radially and axially directed cutting of the radially inward directed surface of the bore during association of the respective tool therein.

In alternate embodiments, is further appreciated that one or more of tools 22-30 can be provided in a tube shape and/or be provided in a generally hollow shape so as to facilitate the extraction of the spoils associated with operation of tools 20-30 relative to the underlying cured concrete material as disclosed further below.

Figure 1:
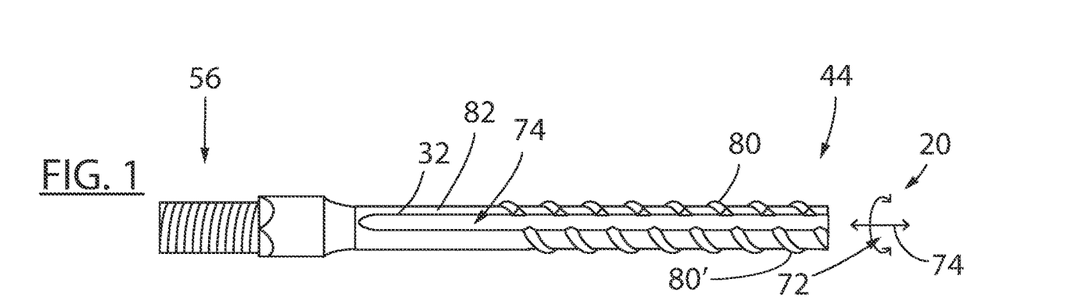
FIG. 1 is a plan view of a concrete working tool according to one embodiment of the present invention.
Figure 2:
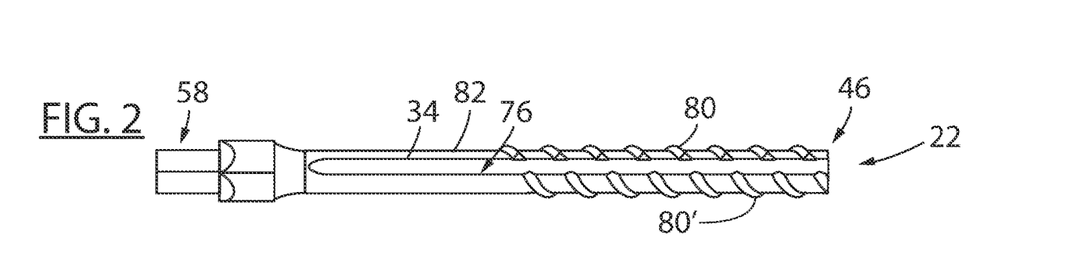
FIG. 2 is a plan view of a concrete working tool according to another embodiment of the present invention.

Regardless of the construction of the discrete body of the respective tool 20-30 as being solid or hollow cored, each concrete working tool 20-30 includes one or more projections 80, 80' that extend in an outward radial direction relative to axis 74 and relative to the exterior facing surface 82 of the underlying cured concrete working tool 20-30. As shown in FIGS. 1 and 2, in some embodiments, projections 80, 80' are oriented to extend in a helical pattern about a portion of respective tools 20, 22 wherein each discrete helix is interrupted by respective channel 74, 76. It is further appreciated that each respective tool 20-30 can include more than one channel or groove and that the respective channels or grooves are displaced or offset from one another in a radial direction about an exterior surface of the respective tool. It is further appreciated that, regardless of the number of grooves provided, if any, it is further appreciated that any such grooves can extend varied lengths along the exterior of surface of the respective tool and can be formed only along portions thereof. It is further appreciated that and such grooves can further be formed to extend in a generally axial or more helical manner about the exterior surface of the respective concrete working tool.

Figure 4:
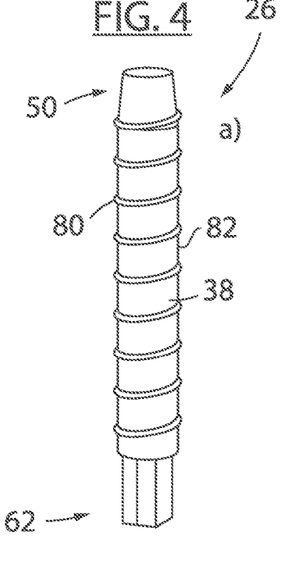
FIGS. 4-6 are graphic representations of concrete working tools according to other embodiments of the present invention.
Figure 5:
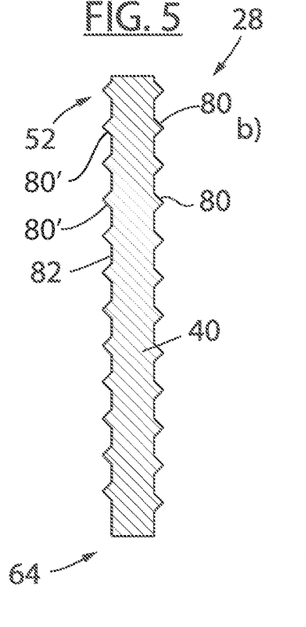
Figure 6:
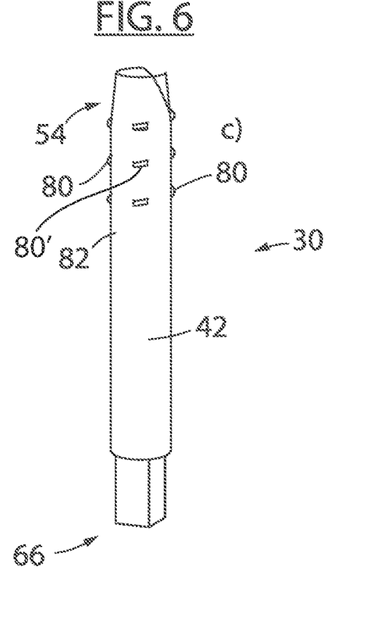

As shown in FIGS. 3 and 4, in alternate embodiments, respective projections 80, 80' extend in a generally uninterrupted helical manner about the exterior facing surface of a portion of a respective tool 24, 26. In yet another alternate embodiment, as shown in FIGS. 5 and 6, projections 80, 80' are spaced both radially and axially relative to the respective body 40, 42 associated with the underlying tool 28, 30. As disclosed further below with respect to FIG. 8, it is appreciated that projections 80, 80' are oriented about the respective body of the respective tool to form a helical discontinuity that extends in an outward radial direction relative to the bore during treatment of the surrounding wall defined by the cured concrete or stone material.

Regardless of the relative orientation of the respective projections 80, 80' and/or the discrete number of projections associated therewith, projections 80 are preferably constructed to provide a cutting operation associated with interaction of the discrete projections with an underlying cured concrete material, and more specifically, a radially inward directed surface of a discrete perforation formed therein. Understandably, projections 80, 80' can be formed of any material capable of working cured concrete materials such as hardened carbon steels, stainless steel materials, ceramic materials, and/or diamond or diamond coated materials. Regardless of the orientation and/or other configurations, projections 80, 80' are constructed to facilitate the longevity associated with repeated use and operation of discrete tools 20-30 to effectuate both of a cutting operation associated with a perforation defined by cured concrete, stone, or concrete materials as well as removal or disengagement of the discrete tool, and any projections associated therewith, from each recently treated bore or hole as disclosed further below.

Figure 7:
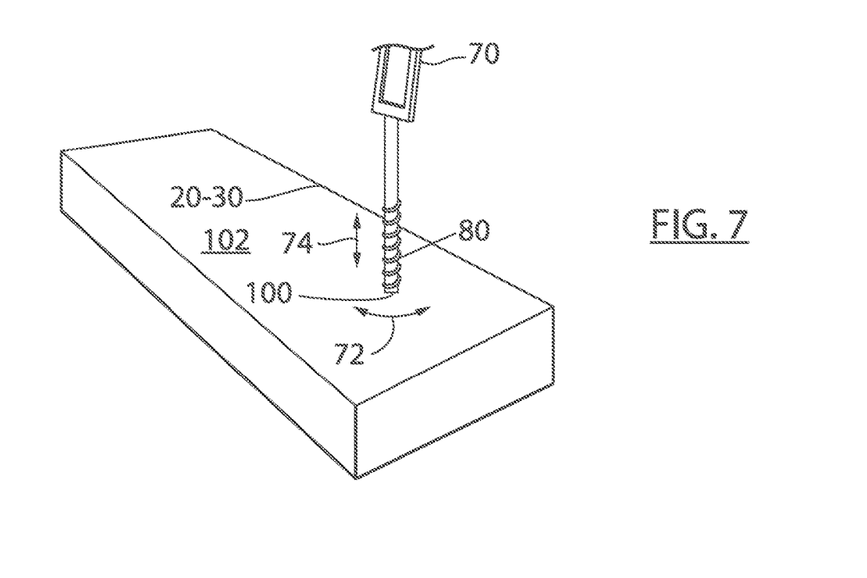
FIG. 7 is a graphic representation of the concrete working tool shown in FIG. 1 being introduced to a bore formed in a concrete material.
Figure 8:
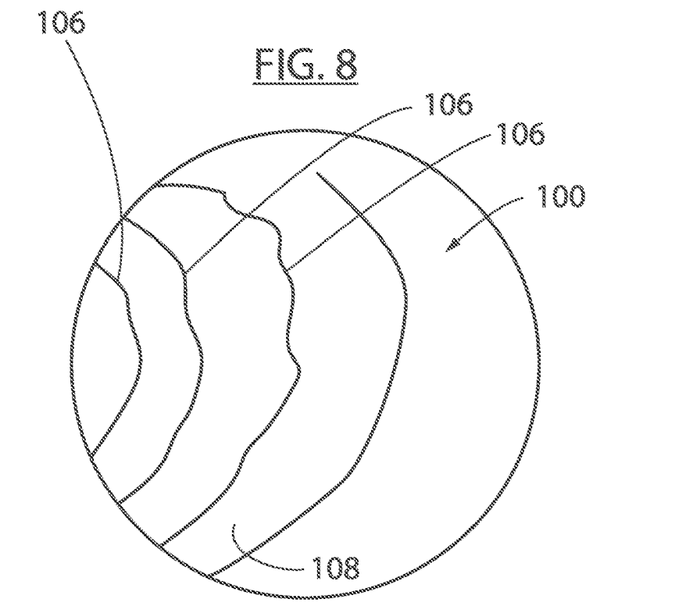
FIG. 8 is a perspective view of the bore shown in FIG. 7 after the concrete working tool has been introduced to the bore and removed therefrom.

Referring to FIG. 7, each discrete tool 20-30 is constructed to be axially associated with discrete holes, bores, or perforations 100 formed in cured concrete materials 102. Rotation of discrete tools 20-30, as indicated by arrow 70, relative to perforation 100 effectuates rotation of discrete projections 80, 80' relative thereto and affects the formation of a plurality of channels, grooves, or threads 106 being formed in a radially interior facing surface 108 associated with perforation 100 of cured concrete material 102 as shown in FIG. 8. Although respective threads 106 are shown as what is commonly understood as having a generally right-hand or clockwise orientation relative to material 102, it is appreciated that the orientation of respective projections 80, 80' can be provided in a manner so as to effectuate counterclockwise formation of discrete threads 106 relative to perforation 100 associated with cured concrete material 102.

Figure 9:
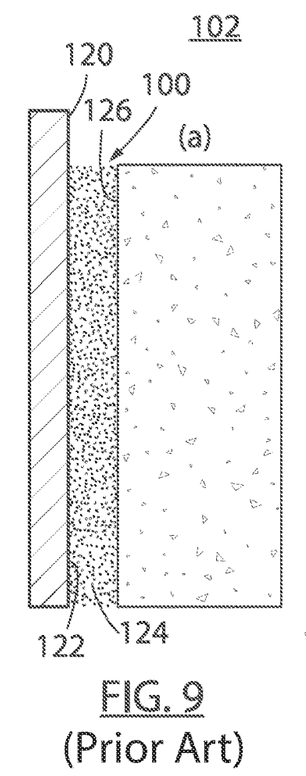
FIGS. 9-11 are various cross section graphic representations of fasteners being associated with bores formed in concrete or stone materials.
Figure 10:
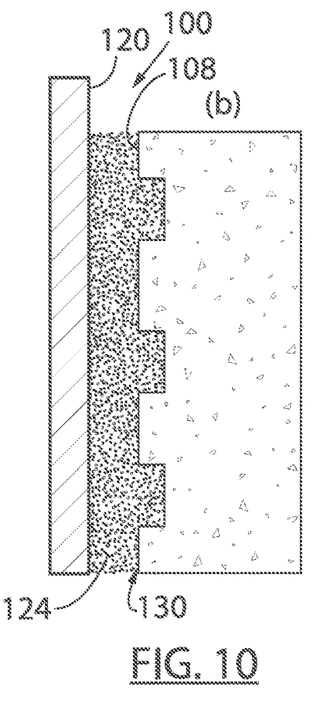
Figure 11:
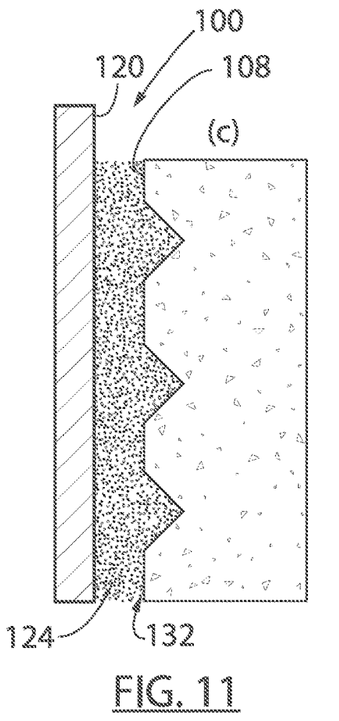

Referring to FIGS. 9-11, currently employ adhesively secured mechanical anchor methodologies associated with placement of discrete anchors 120 results in configurations wherein a generally planar surface 122 associated with the exterior surface of anchor 120 interacts with an adhesive 124 deposited within perforation 100, and in a similar manner, a radially interior facing surface 126 associated with cured concrete material 128 also provides a generally planar interface with adhesive 124. As disclosed above, the generally planar interface results in a generally linear orientation of the axially directed forces associated with loading of the discrete anchors in directions aligned with the longitudinal axis of the bore and which is also preferably axially aligned with the longitudinal axis of the anchor to mitigate dissimilar circumferential loading of the discrete anchor.

Referring to FIGS. 10 and 11, treatment of cured concrete material 128, and specifically, the radially interior facing surface 108 associated with discrete perforations 100 creates a respective nonplanar interface 130, 132 between adhesive 124 and the radially interior facing surface 108 associated with perforation 100 after perforation 100 has been treated with any one of tools 20-30 in preparation of receiving adhesive 124 and subsequently anchor 120. The non-planar interface 130-132 associated with the radially interior facing surface 108 associated with each discrete perforation 100 both increases the surface area associated with operation of adhesive 124 and manipulates the directional forces associated with the failure therebetween and the interface of the cured concrete surface associated with each discrete perforation 100 and the resultant anchor or fastener engaged therewith. During empirical testing, an anchor adhesively secured to a bore formed in a cured concrete material and whose radially inward directed surface was treated in accordance with the disclosure of the present application was compared to a results acquired from a similarly fixtured securing and testing methodology aside from the post bore formation/pre adhesive placement treatment of the radially inward directed surface of the bore with a corresponding concrete working tool when both samples were subjected to tensile loading of the exposed portion of the discrete concrete anchors. The results therebetween showed a definitive mitigation creep failure advantage or improvement when the adhesively secured anchors were secured to underlying cured concrete materials having bores treated with the cured concrete working tools as compared to untreated bores formed in the same materials.

That is, upon curing, the hardened adhesive in the threads fundamentally change the load carrying mechanism of the adhesive-concrete interface from shear adhesion to mechanical interlock. Each of cured concrete working tools 20-30 effectuates the desired manipulation of the loading characteristics between the adhesive and the underlying cured concrete and does so in a manner that maintains a spaced relationship of the respective anchor or fastener relative to the interior facing surface of the respective perforation with which it is associated. Such consideration provide an adhesive anchor securing methodology that is convenient to integrate with current adhesive anchor methodologies, can be implemented without substantial impact to production aspects, and improves the failure avoidance performance characteristics of adhesively secured anchors and/or fasteners secured in such a manner.

It is appreciated that working tools can be provided in various configurations. Preferably, working tools are configured to cooperate with a desired bore that is associated with receiving a corresponding fastener or anchor. Such anchors are provided in a variety of sizes but more commonly having diameters of ¼ inch to three inches, understandably, depending upon the respective loads intended to be secured. Similarly, adhesives 124 are commonly selected to cooperate with the underlying base material—cured concrete, stone, porous, less porous, etc.; the size of the fastener or the thickness of the adhesive bed, moisture and temperature cycles, etc.; and the material associated with the construction of the fastener or anchor intended to be deployed—stainless steel, carbon steel, carbide, etc. Preferably, secured anchors are configured to withstand seasonal temperature deviations plus suitable factors of safety associated with the geographic regions or operating environments associated with application. In a preferred aspect, the discrete fastener mounting arrangements are configured to tolerate operate environment maximum temperatures of between approximately 110 degrees Fahrenheit to approximately 160 degrees Fahrenheit which generally correlate to northern hemisphere seasonal high temperatures. Commonly, the underlying stone or cured concrete strengths vary from approximately 3000 PSI to 20000 PSI—again, depending upon the application.

Similarly, ranges of moisture and cyclic loading of the interface between the fastener and the underlying cured concrete or stone and adhesive can also vary. Preferably, each mounting arrangement is configured to withstand multiple hundreds, thousands, or millions of cyclic influences. For instance, common applications are often subjected to several hundred moisture and drying cycles, several hundred or thousand freeze-thaw cycles (depending upon the environment and application, cyclic fatigue stresses in the nature of 10 million or more cycles, as well as low-cycle fatigue loading such as seismic loading or earthquake conditions wherein anchors are expected to maintain their desired load capacities while developing deformation. Preferably, during seismic performance, properly configured anchor securing arrangements are configured to tolerate at least ten times its deformation to yield.

Another consideration to anchor or fastener securing success is directed to adhesive selection and association of anchor size, bore side, and the adhesive bond interfaces formed therebetween as manipulated by the plurality of channels associated with the bore treated with a corresponding bore working tool as disclosed herein. Preferably, the bond line thickness associated with the interface between the adhesive 124 and the corresponding interfaces of the treated bore and the anchor or fastener varies from about 3 inches or six times the anchor diameter to approximately 30 inched or 15 times the anchor diameter. Understandably, the available embedment depth can vary widely between applications, such as some industrial wind turbine applications which include embedding depths of 9 feet, such that other bond line dimensions are feasible. Similarly, it is appreciated that the composition of adhesive 124 can vary widely and include organic, inorganic compounds, epoxy materials, etc.

As disclosed above, it is appreciated that the cured concrete working tool can be provided in various configurations and constructions without departing from the claimed invention. Each working tool 20-30 preferably includes a steel driving shaft with carbide cutting tips attached to a radially exterior facing surface thereof. Each respective tool 20-30 is preferably configured to cooperate with driving tool, such as a common impact wrench with a hex/square socket. The impact wrench can be electrical or pneumatic with square or hex driving shaft. The driving end associated with each respective tool 20-30 can also be provided in any of a male or female drive interface and/or configured to receive a hex/square driving shaft of a common impact wrench. The cutting end or work facing end of each tool 20-30 can be round, square, or lobed.

The discrete cutting projections 80 can be arranged in a helix pattern with varying heights to effectuate the cutting effect and/or to create self-driving and extracting features. The discrete projections 80, 80' can be made in natural diamond, hard metal, tungsten carbide, silicon carbide, titanium carbide or other cemented carbide. Alternatively, carbide cutting tips can be installed on the metal driving shaft using forging process, gluing process, screwing process, and/or welding process to define the various projections 80, 80'. The portions of the discrete tools associated with projections 80, 80' can be triangular, trapezoidal, oblong, non-round and/or square and with an upper width that is equal to or less than the lower width. That is, each respective tool 20-30 can have a tapered shaped wherein the smallest outer diameter or shape is associated with the distal end of the work facing end of the discrete tool.

It is further appreciated that the discrete bodies 32-42 associated with discrete tools 20-30 can be provided in various sizes and shapes. That is, tools 20-30 can be provided in various sizes or diameters and various lengths configured to accommodate current and future anchor constructions and configurations. As disclosed above, the discrete bodies 32-42 can be solid or hollow and round, hexagon, multilateral lobe shaped, include one or more threads that extend axially or helically about the shaft, etc. It is further appreciated that one or more of tools 20-30 can be constructed to cooperate with a vacuum system to effectuate extraction of the spoils during formation of the threads during operation of the discrete tool with a respective perforation.

The present invention has been described in terms of the preferred embodiment. The several embodiments disclosed herein are related as being related to the assembly as generally shown in the drawings. It is recognized that equivalents, alternatives, and modifications, aside from those expressly stated, the embodiments summarized, or the embodiment shown in the drawings, are possible and within the scope of the appending claims. The appending claims cover all such alternatives and equivalents.

What is claimed is:

1. A method of providing an adhesive cured concrete or stone anchor system, the method comprising:

forming a perforation in a cured concrete or stone material;

rotationally and axially impact driving a working tool along a rotational axis aligned with a longitudinal axis of the perforation and wherein the working tool is defined by a body having at least one projection extending in a radial direction from the body a distance that is greater than a diameter of the perforation formed in the cured concrete or stone material to form at least one channel in a radially inward directed surface of the perforation formed in the cured concrete or stone material that faces the perforation by cutting cooperation of the at least one projection with the inward directed surface of the perforation as the working tool is rotationally and axially driven into the perforation and such that a majority of the at least one channel has a radius that is greater than a smallest radius associated with an exterior surface of the cured concrete or stone material about the perforation;

extracting the working tool from the perforation by rotating the working tool in an opposite rotational direction while axially translating the working tool in a second axial direction that is opposite the first axial direction while the at least one projection is engaged with the at least one channel;

disposing an amount of an adhesive in the perforation; and placing an anchor in the perforation such that the anchor is offset in a radially inward direction from the radially inward directed surface of the cured concrete or stone material along a length of the anchor that is inboard of the exterior surface of the cured concrete or stone material.

2. The method of claim 1 further comprising removing spoils associated with formation of the perforation and formation of the at least one channel by vacuum pressure being introduced to an elongate channel defined by the working tool and prior to disposing the amount of the adhesive in the perforation.

3. The method of claim 1 wherein forming the at least one channel further comprises forming a channel having a helical shape in the radially inward directed surface of the perforation.

4. The method of claim 3 wherein forming the at least one channel further comprises forming more than one channel that each have a helical pattern and that are radially offset from one another relative to a longitudinal axis of the perforation.

\* \* \* \* \*